INVENTORS
FLOYD A. HUMMEL
JAMES F. SARVER, JR.

$$\text{United States Patent Office}$$

3,725,102
Patented Apr. 3, 1973

---

3,725,102
INORGANIC PIGMENTS
Floyd A. Hummel, State College, Pa., and James F. Sarver, Jr., Lyndhurst, Ohio, assignors to Ferro Corporation, Cleveland, Ohio
Continuation-in-part of application Ser. No. 664,337, Aug. 30, 1967, which is a continuation-in-part of application Ser. No. 344,363, Feb. 12, 1964. This application July 18, 1969, Ser. No. 843,164
Int. Cl. C09c 1/00
U.S. Cl. 106—288 B           18 Claims

ABSTRACT OF THE DISCLOSURE

A bluish-pink pigmented work product deriving its bluish-pink color from a calcined pigment composed of about 10 to 55 parts by weight of CoO, about 1 to 35 parts by weight $Li_2O$ and about 40 to 72 parts by weight $P_2O_5$.

---

Figure 1:
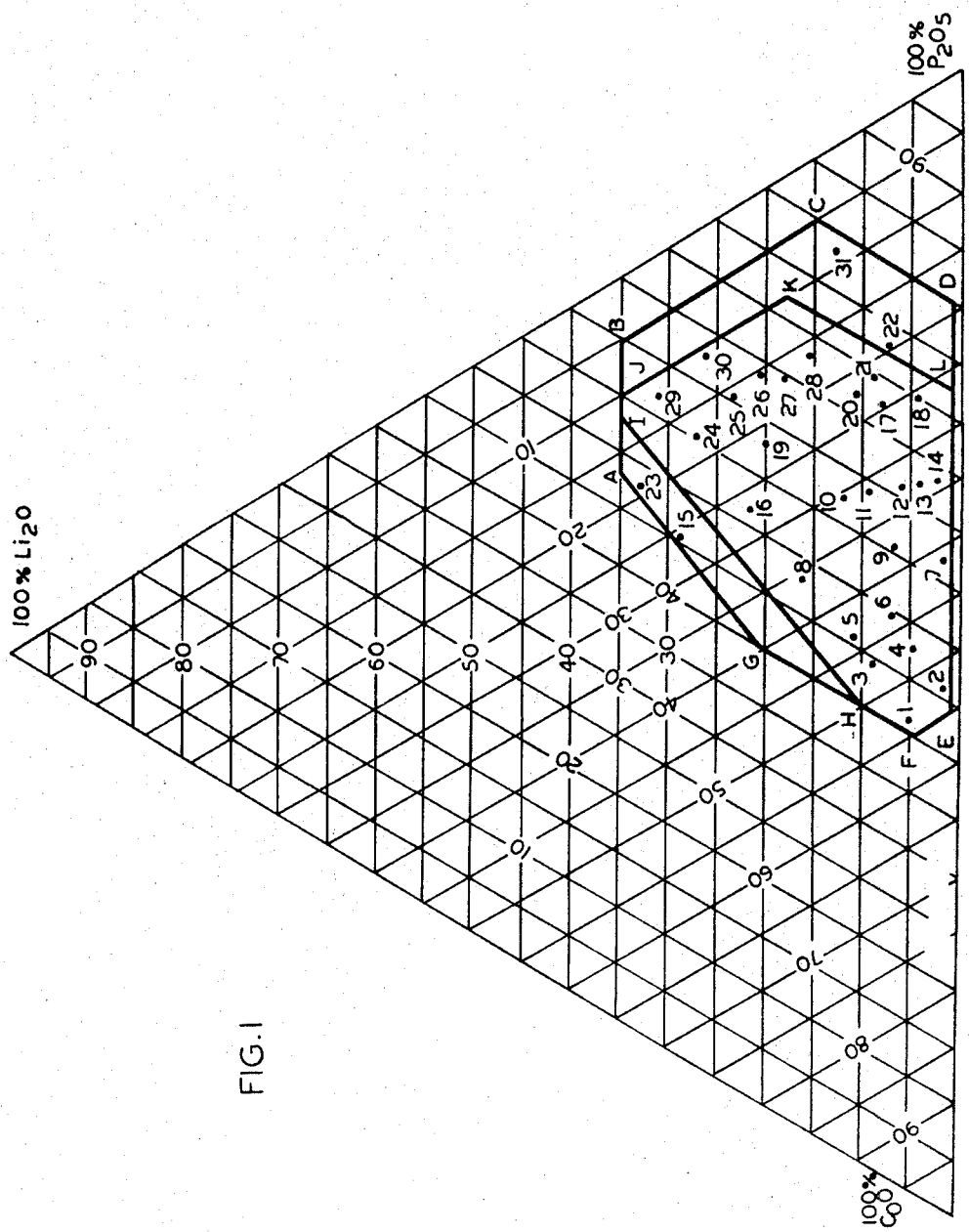

This application is a continuation-in-part of our application, Ser. No. 664,337, filed Aug. 30, 1967, which in turn is a continuation-in-part of then pending application Ser. No. 344,363, filed Feb. 12, 1964, both now abandoned.

It has been found that, by calcining together an intimate admixture of the oxides of cobalt, lithium and phosphorus in certain ratios, or in the alternative, compounds of cobalt, lithium and phosphorus containing respectively the proper stoichiometric quantities of cobalt, lithium and phosphorus to provide the required ratio of oxide equivalents of each, upon calcination, there is produced a most pleasing and superior bluish to pink pigment useful for lending color to any number of articles, such as paints and plastics, by the usual procedures well known in the art for coloring such materials.

Briefly stated, this invention consists essentially of an article of manufacture which has been colored or tinted with a pigment which is the product of the process of intimately admixing a cobalt compound, capable of yielding roughly the oxide equivalent of from 5 to 55 parts by weight of the finished pigment of cobalt oxide, with a lithium compound, capable of yielding the oxide equivalent of from about 1 to 35 parts by weight of the finished pigment of lithium oxide, and a phosphorus compound, capable of yielding the oxide equivalent of from about 40 to 80 parts by weight of the finished pigment of $P_2O_5$, then calcining said admixture at a temperature of from about 250° C. to about 1000° C. for from about 2 to 4 hours to produce the desired pigment; the preferred ranges of the oxide equivalents of cobalt, lithium and phosphorus being 10 to 55, 1 to 35 and 40 to 72 parts respectively.

While the foregoing times and temperatures are those which we have found to be most practical for carrying out this invention, as is well known in the art of calcining inorganic pigments, calcination must be carried out for a sufficient length of time, depending upon the size of the batch, degree of fineness, capacity of the furnace, etc., to produce the required shade, it being well known that time and temperature may be varied over wide limits to produce a given level of heat treatment in a calcination process.

After the calcination cycle has been completed, and the calcined batch cooled, it is then crushed, milled to extremely fine particle size in a suitable medium in which the pigment is insoluble, such as acetone, following which the pigment is dried, and micropulverized after which it is in condition for incorporation into paints, plastics, etc., as a coloring pigment.

Accordingly, it is an object of this invention to provide a bluish to pink pigment composition comprising the oxide equivalents of cobalt, lithium and phosphorus.

It is still another object of this invention to provide a method for imparting a bluish to pink color to articles of manufacture, and to provide the products of such method.

It is yet another object of this invention to provide a method for manufacturing a bluish to pink pigment comprising oxide equivalents of cobalt, lithium and phosphorus.

The pigments of the present invention have a cleaner color and more pleasing hue than bluish to pink pigments used heretofore, and are therefore considered to be a decided advance in the art. They furthermore exhibit no bleeding or exudation from plastic resins into which they are incorporated, as has been experienced with previous pigments of this general color. They are further much more stable than previous colors of this general class.

The desirable pre-calcination components of the pigments of this invention are various compounds of cobalt, phosphorus and lithium such as the carbonates of the metals lithium and cobalt, ammonia compounds of phosphorus such as ammonium phosphate, oxide of cobalt, inter alia. And, while these compounds we have found are most convenient to use, it is of course possible to use any compound of any one of the elements cobalt, lithium and phosphorus capable of yielding its respective required oxide equivalent upon calcination. Thus, the carbonates and phosphates giving up their volatile components upon sintering in an oxidizing atmosphere are available at some time during sintering for whatever co-acting phenomenon takes place to create the pigments of this invention. As is well known, nitrates of cobalt and lithium are also workable means for introducing the various oxide equivalents, as are the phosphorus compounds of lithium and cobalt.

So far as the preliminary preparation of the starting compounds is concerned, any conventional method of milling them into a fine powder form for intimate mixing prior to calcination may be employed, such methods being well known in the art.

After thoroughly mixing, the tricomponent system is calcined in conventional saggers in a suitable furnace, in a nonreducing atmosphere for the required time and temperature as indicated in the examples set forth below. After calcining, the pigment is cooled to room temperature and may again be milled in a suitable medium in which the finished pigment is not soluble, followed by drying and micropulverization; or the pigment may be taken directly from the calcining operation and micropulverized. Following final micropulverization, the pigment is then ready for incorporation into various materials as hereinafter described.

In the attached drawings, FIG. 1 represents a triaxial diagram showing two areas defined by polygons, the larger covering the scope of this invention generally, with the more restricted area covering the area of preferred embodiment.

Figure 2:
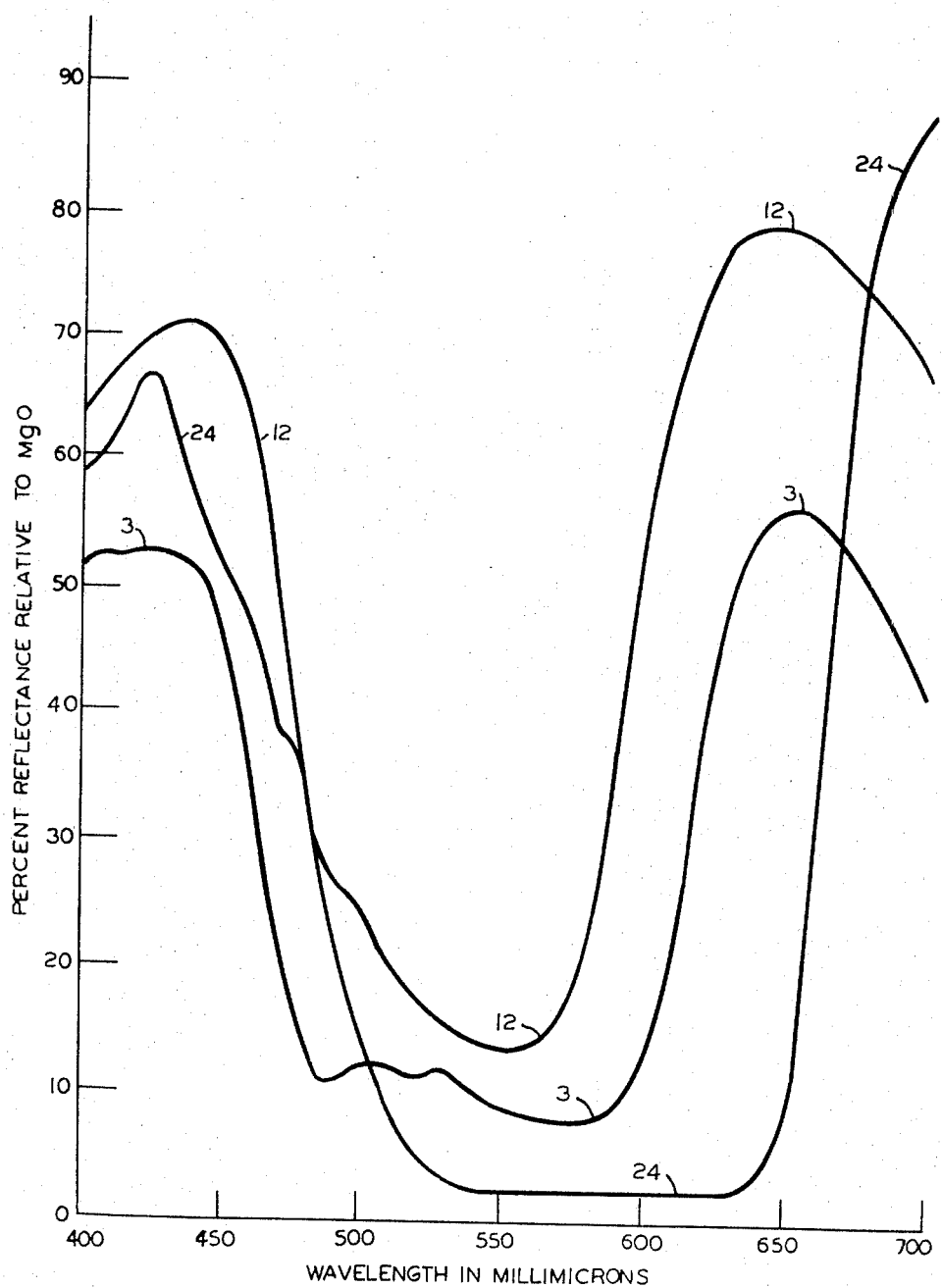

FIG. 2 depicts spectrophotometer curves of three of the pigments of this invention.

By way of demonstration but not by limitation, following is a list of illustrative examples covering typical compositions and embracing preferred embodiments of our invention. These illustrations are exemplary of but only a few of the innumerable variations possible without departing from the principle and scope of our inventive concept.

Table I below illustrates a series of batch compositions which were calcined according to the foregoing general procedure, departures from this general procedures such as calcination temperature, calcination time, etc. being set forth in subsequent Table II. In each example in Table I, the raw batch (pre-calcination) components for incorporating cobalt, lithium and phosphorus were, respectively, the carbonate of lithium, the carbonate of cobalt and the phosphate of ammonia. The number in the left hand column identifies the particular sample number, and also corresponds to the position of the calcined pigment on the triaxial diagram of FIG. 1.

TABLE I

| Number | Weight percent | | |
|---|---|---|---|
| | $Li_2CO_3$ | $CoCO_3$ | $(NH_4)_2HPO_4$ |
| 1 | 7.03 | 49.13 | 43.85 |
| 2 | 2.27 | 49.15 | 48.58 |
| 3 | 12.64 | 42.18 | 45.17 |
| 4 | 6.81 | 44.79 | 48.40 |
| 5 | 15.43 | 38.61 | 45.96 |
| 6 | 9.50 | 39.60 | 50.90 |
| 7 | 2.08 | 38.27 | 59.64 |
| 8 | 21.30 | 31.11 | 47.60 |
| 9 | 9.08 | 34.11 | 56.82 |
| 10 | 16.02 | 26.73 | 57.25 |
| 11 | 12.64 | 27.80 | 59.56 |
| 12 | 8.70 | 29.05 | 62.25 |
| 13 | 6.31 | 29.82 | 63.87 |
| 14 | 4.07 | 30.53 | 65.40 |
| 15 | 35.91 | 21.31 | 42.78 |
| 16 | 27.73 | 22.70 | 49.57 |
| 17 | 10.84 | 21.73 | 67.44 |
| 18 | 5.95 | 23.16 | 70.89 |
| 19 | 25.92 | 18.46 | 55.61 |
| 20 | 13.98 | 19.42 | 66.59 |
| 21 | 11.59 | 19.34 | 69.07 |
| 22 | 10.19 | 17.00 | 72.81 |
| 23 | 40.24 | 15.50 | 44.26 |
| 24 | 34.41 | 14.34 | 51.24 |
| 25 | 29.37 | 13.37 | 57.26 |
| 26 | 26.16 | 13.11 | 60.72 |
| 27 | 23.23 | 14.50 | 62.27 |
| 28 | 19.84 | 14.22 | 65.94 |
| 29 | 38.00 | 9.76 | 52.25 |
| 30 | 3.62 | 9.07 | 58.31 |
| 31 | 16.99 | 7.09 | 75.92 |

NOTE—Assay: 47.8% Co.

Table II below corresponds, as will be seen, to Table I in that the compositions of Table II are set forth in the same order showing the calculated oxide composition of the respective batches set forth in Table I, calcination temperature, the total calcination time in hours and the color of the final, micropulverized pigment.

TABLE II

Calculated $Li_2O$-$CoO$-$P_2O_5$ Compositions

| No. | Composition, wt. percent | | | Calcining temp., °C. | Calcining time, hours | Calcined pigment color |
|---|---|---|---|---|---|---|
| | $Li_2O$ | CoO | $P_2O_5$ | | | |
| 1 | 5.05 | 53.06 | 41.88 | 725 | 2 | Red-purple. |
| 2 | 1.61 | 52.50 | 45.89 | 750 | 2 | Dark, blue-purple. |
| 3 | 9.29 | 46.59 | 44.12 | 700–725 | 2 | Red-purple. |
| 4 | 4.92 | 48.62 | 46.46 | 725 | 2 | Purple. |
| 5 | 11.47 | 43.14 | 45.50 | 675 | 2 | Plum. |
| 6 | 6.95 | 43.55 | 49.50 | 700 | 2 | Blue-purple. |
| 7 | 1.50 | 41.42 | 57.08 | 725 | 2 | Dark, blue-purple. |
| 8 | 16.22 | 35.60 | 48.17 | 700 | 2 | Dark lavendar. |
| 9 | 6.68 | 37.73 | 55.58 | 650 | 2 | Magneta. |
| 10 | 12.11 | 30.37 | 57.52 | 625 | 2 | Lavender. |
| 11 | 9.46 | 31.28 | 59.25 | 625–650 | 2 | Red-purple. |
| 12 | 6.44 | 32.32 | 64.23 | 625 | 2 | Bright purple-pink. |
| 13 | 4.64 | 32.95 | 62.41 | 625–650 | 2 | Do. |
| 14 | 2.97 | 33.52 | 63.50 | 700 | 2 | Purple-pink. |
| 15 | 28.77 | 25.66 | 45.56 | 900 | 2 | Balck. |
| 16 | 21.71 | 26.71 | 51.58 | 750 | 2 | Blue-purple. |
| 17 | 8.14 | 24.53 | 67.33 | 600 | 2 | Bright purple-pink. |
| 18 | 4.41 | 25.79 | 69.80 | 650 | 2 | Do. |
| 19 | 20.32 | 21.75 | 57.93 | 725 | 2 | Blue-lavender. |
| 20 | 10.62 | 22.17 | 67.21 | 600 | 2 | Bright purple-pink. |
| 21 | 8.75 | 21.95 | 69.30 | 610 | 2 | Do. |
| 22 | 7.69 | 19.28 | 73.03 | 350 | 2 | Violet. |
| 23 | 32.89 | 19.04 | 48.08 | 725 | 2 | Dark gray-black. |
| 24 | 27.73 | 17.38 | 54.89 | 750–875 | 2–4 | Drak royal blue. |
| 25 | 23.39 | 16.00 | 60.61 | 700 | 2 | Light violet. |
| 26 | 20.67 | 15.57 | 63.76 | 625 | 2 | Medium violet. |
| 27 | 18.18 | 17.05 | 64.76 | 600 | 2 | Blue-lavender. |
| 28 | 15.40 | 16.58 | 68.01 | 575 | 2 | Blue-pink. |
| 29 | 31.12 | 12.01 | 56.87 | 725 | 2 | Deep blue. |
| 30 | 26.36 | 11.02 | 62.62 | 725 | 2 | Medium gray-blue. |
| 31 | 13.22 | 8.29 | 78.49 | 325 | 2 | Dark blue. |

As described in the "color" column of Table II, it will be seen that pigments within the general polygon ABCDEFG range from dark intense purples to more pastel shades of the lighter bluish pinks; with the smaller polygon which covers the preferred area the difference between extremes of color variation are not quite so pronounced as in the larger polygon.

In order to evaluate the effect of additional compounds added to the basic trioxide pigment batch, a number of calcinations were made as shown in Table III wherein compounds such as soda ash, magnesium carbonate, zinc oxide and zinc phosphate were incorporated into the batch.

TABLE III

| Number | Weight percent | | | | | | |
|---|---|---|---|---|---|---|---|
| | $Li_2CO_3$ | $Na_2CO_3$ | $CoCO_3$ | $MgCO_3$ | ZnO | $Zn(PO_3)_2$ | $(NH_4)_2HP_4$ |
| 32 | 2.04 | 2.92 | 29.51 | | | | 65.53 |
| 33 | 35.29 | | 7.10 | 5.04 | | | 52.56 |
| 34 | 13.23 | | 31.94 | 7.56 | | | 47.28 |
| 35 | 13.65 | | 21.97 | 15.60 | | | 48.79 |
| 36 | 14.10 | | 11.35 | 24.16 | | | 50.39 |
| 37 | 34.96 | | 10.55 | | 2.41 | | 52.07 |
| 38 | 13.20 | | 40.36 | | | 3.99 | 42.45 |
| 39 | 13.58 | | 39.36 | | | 8.21 | 38.84 |
| 40 | 13.99 | | 38.30 | | | 12.69 | 35.02 |
| 41 | 14.43 | | 37.17 | | | 17.45 | 30.95 |
| 42 | 14.90 | | 35.97 | | | 22.51 | 26.62 |
| 43 | 15.39 | | 34.67 | | | 27.91 | 22.01 |
| 44 | 19.48 | | 0.63 | | 21.02 | 58.87 | |
| 45 | 19.44 | | 1.25 | | 20.55 | 58.76 | |
| 46 | 19.32 | | 3.11 | | 19.66 | 58.41 | |
| 47 | 19.14 | | 6.16 | | 16.86 | 57.84 | |
| 48 | 18.95 | | 9.15 | | 14.61 | 57.28 | |
| 49 | 18.77 | | 12.09 | | 12.40 | 56.74 | |
| 50 | 18.59 | | 14.97 | | 10.24 | 56.20 | |
| 51 | 18.42 | | 17.79 | | 8.11 | 55.67 | |

Table IV below covers the final oxide equivalent compositions corresponding with their respective pre-calcination mixes shown in Table III. Table IV showing the calcination time and temperature for the various mixes and the resultant color.

The resins used in this series of examples were Alathon #14, a polyethylene resin manufactured by E. I. du Pont de Nemours and Company, Inc. of Wilmington, Del., having those properties set forth in Bulletin A-27266, Aug. 22, 1962, published by the manufacturer; Marlex

TABLE IV

| Number | Calculated composition, wt. percent |  |  |  |  |  | Calcining temp., °C. | Calcining time, hours | Color |
|---|---|---|---|---|---|---|---|---|---|
|  | Li$_2$O | Na$_2$O | CoO | MgO | ZnO | P$_2$O$_5$ |  |  |  |
| 32 | 1.46 | 3.03 | 33.00 |  |  | 62.50 | 825 | 2 | Lavender. |
| 33 | 28.89 |  | 9.06 | 4.87 |  | 571.8 | 825 | 2 | Medium blue. |
| 34 | 9.82 |  | 36.93 | 6.62 |  | 46.63 | 750 | 4 | Purple-pink. |
| 35 | 10.41 |  | 26.10 | 14.04 |  | 49.44 | 750 | 4 | Do. |
| 36 | 11.08 |  | 13.89 | 22.42 |  | 52.62 | 750 | 4 | Light purple-pink. |
| 37 | 27.54 |  | 13.24 |  | 4.69 | 54.52 | 825 | 2 | Bright blue. |
| 38 | 9.27 |  | 44.17 |  | 2.52 | 44.03 | 700 | 4 | Dark purple-pink. |
| 39 | 9.25 |  | 41.76 |  | 5.04 | 43.95 | 700 | 4 | Do. |
| 40 | 9.23 |  | 39.36 |  | 7.54 | 43.86 | 700 | 4 | Do. |
| 41 | 9.21 |  | 36.97 |  | 10.04 | 43.77 | 700 | 4 | Blue-pink. |
| 42 | 9.20 |  | 34.60 |  | 12.52 | 43.69 | 700 | 4 | Lavender. |
| 43 | 9.18 |  | 32.22 |  | 15.00 | 43.60 | 700 | 4 | Dark lavender. |
| 44 | 8.93 |  | 0.45 |  | 48.18 | 42.44 | 750 | 4 | Very light gray-blue. |
| 45 | 8.94 |  | .90 |  | 47.71 | 42.46 | 750 | 4 | Light gray-blue. |
| 46 | 8.95 |  | 2.24 |  | 46.30 | 42.51 | 750 | 4 | Light blue. |
| 47 | 8.96 |  | 4.50 |  | 43.95 | 42.59 | 725 | 4 | Medium blue. |
| 48 | 8.98 |  | 6.76 |  | 41.59 | 42.67 | 725 | 4 | Do. |
| 49 | 9.00 |  | 9.00 |  | 39.23 | 42.77 | 725 | 4 | Blue. |
| 50 | 9.02 |  | 11.31 |  | 36.84 | 42.84 | 725 | 4 | Do. |
| 51 | 9.03 |  | 13.59 |  | 34.45 | 42.92 | 725 | 4 | Dark blue. |

From Table IV it will be readily apparent that, even though any number of auxiliary compounds are added to the pre-calcination mix, so long as the percentages of the oxide equivalents of cobalt, lithium, and phosphorus are maintained within the range covered by this invention, a most desirable bluish to bluish pink pigment is still obtained.

Thus, it appears that a number of compounds may be added to the pigment composition of this invention for the purpose of slightly shifting the color in one direction or another, or arriving at a more pastel shade of certain of these colors, without departing from the primary novel effects achieved by calcination of the three basic components of these pigments to provide their oxide equivalents within the critical percentage ranges set forth above and as shown in FIG. 1.

To illustrate one form of utility of these pigments, the colors of the present invention were incorporated into various plastic media according to the following procedures.

10 ml. each of the cobalt-lithium-phosphate pigments of Table II were dispersed in 10 ml. of an 8% water solution of polyvinyl alcohol. A 3 mil thick film was cast on a split black and white card, the suspension liberally covering both portions, and allowed to dry.

The polyvinyl alcohol film, in every case, displayed a tone and color quite similar to the respective pigment with which each sample was tinted, when viewed over the white portion of the card, and fair to good covering power when viewed over the black. FIG. 2 depicts representative spectrophotometer curves of certain pigments, viewed over the white portion of the card in polyvinyl alcohol; as seen from FIG. 2, the pigments are Nos. 3, 12 and 24.

Pigments #3 and 12 of Table II were also incorporated into various thermoplastic resins, according to the following procedure: To 100 grams of resin, 2 grams of pigment was added and the mix placed into a quart jar and shaken for one minute in a conventional paint shaker. The dry pigment-resin blend was then put through a laboratory injection molder (Van Dorn Model H-200) at the optional molding temperature of each resin, and pressed into a cavity to form chips approximately 1¾ x 2¼ inches in size, each chip having a segment, respectively, 0.05, 0.1 and 0.15 inch thick. Again, in every case, the pigment-plastic resin dispersion was essentially the same color as the pigment and in every case, the pigment imparted the same correspondingly pleasant shade to the thermoplastic resin as exhibited by the pigment itself.

6050 high density polyethylene manufactured by the Phillips Chemical Company of Bartlesville, Okla. having those properties as set forth in the Phillips Technical Information Bulletin dealing with Marlex plastics as revised July 1960; Styron #475 high impact polystyrene manufactured by the Dow Chemical Company, Plastics Department, Midland, Mich., having the properties described in the technical bulletin published by Dow Chemical Company, #171-138A; Lustrex #HF·77 polystyrene manufactured by the Monsanto Chemical Company, Plastics Division, St. Louis, Mo. having the properties as set forth on page 6 of the Monsanto data section occurring between pages 304 and 317 of the 1962 edition of Modern Plastics Encyclopedia; Profax type 6513 polypropylene manufactured by the Hercules Powder Company of Wilmington, Del. having the properties described in the Manufacturer's Bulletin Form 500-411 10M, November 1963, 8105.

In order to check the tinting strength of the pigments #3 and 12 of Table II, a series of tests involving all the previously listed thermoplastic resins was run identically to the tests described above involving thermoplastic resins, except the mix was 100 grams of resin, 1 gram of pigment, and 1 gram of Titanox RA titanium dioxide, which is essentially a pigment grade titanium dioxide very finely milled and intended to impart a degree of opacity to the test chip to produce a pastel shade of each pigment. Injection molding of each pigmented resin system was carried out precisely as described above, and it was observed that the pigment in its respective pastel chip thus produced, retained its original hue quite well.

To demonstrate the adaptability of the pigments of this invention to thermosetting resin systems, the basic formulations according to Table V below were compounded.

TABLE V

|  | Parts by weight | | | |
|---|---|---|---|---|
|  | A | B | C | D |
| Polyester 249 | 85 | 80 | 80 | 75 |
| Filler (CaCO$_3$) | 10 | 10 | 10 | 10 |
| Silica-gel | 1 | 1 | 1 | 1 |
| Titanox RA |  |  | 5 | 5 |
| Pigment #3, Table II | 5 | 10 | 5 | 10 |

249 Polyester contains about 35% styrene monomer, and is manufactured by Reichold Chemical Company. Titanox RA is a finely ground titanium dioxide manufactured by the Titanium Pigment Corporation.

In each case, the foregoing thermosetting systems were set at room temperature with cobalt-naphthenate and methyl-ethyl-ketone-peroxide in one series, and at 200°

F. with benzoyl-peroxide in another series, these techniques being standard and well known in the art.

Each test was made by pouring the pigmented composition into a cylindrical mold and setting the resin in the form of a disk-shaped test piece. In each example, a very pleasant purplish-pink shade was achieved corresponding to the pigment prior to incorporation into the resin and it was observed that the pleasant pink shade thus achieved had never been possible prior to this invention with basically inorganic pigments such as the one of this invention.

In order to evaluate the heat stability of these pigments, pigments #3 and #12 were compounded as set forth above in combination with thermoplastic resins, sans opacifier, for injection molding by a single pass through the cylinder at the normal molding temperatures of 500° F. for polystyrene and linear polyethylene, 450° F. for high impact polystyrene and polyethylene, and 525° F. for polypropylene. Another complete set of test chips utilizing pigment #3 of Table II were then molded by the same procedures except retaining the pigmented plastic for 5 min. in the cylinder at normal molding temperature before casting in order to subject the pigments to above normal heat treatment. A comparison of the chips made following conventional procedures with those produced by extended heating at 5 min. in the cylinder revealed no substantial difference between the pigmented chips produced by normal methods and those subjected to the abnormal heat treatment.

A series of chips were then made according to the foregoing procedures with the five thermoplastic resins as well as the thermosetting polyester, all colored with pigments #3 and #12 of Table II as outlined above, and were exposed to the rays of a twin arc Model OMC–H Atlas Weather-O-Meter by using cam #102–18 (light 102 min., light+water 18 min.) and a black body temperature range of 90° F. for a total of 500 hours.

Visual inspection of the exposed and the unexposed samples revealed an excellent light stability of the pigment and a slight color change from bluish-pink to yellowish-pink was attributed to the yellowing of the resins and not to the fading of the pigment.

Unexposed samples of the weathering tests were immersed in 3% and 30% $H_2SO_4$ water solutions and in 1% and 10% NaOH water solutions for 48 hours. No change in color or surface was visible, indicating a high degree of resistance in these pigments to acid and alkali attack.

To confirm that the beneficial results of this invention are possible with a wider sampling of the pigments listed in Table I, pigments #1, 7, 8, 15, 29, 30 and 31 were run in polypropylene Profax 6511–J in accordance with the above described procedures for thermoplastic resins, both with and without the opacifier ($TiO_2$). As polypropylene has the highest molding temperature it was felt the pigments thereby underwent the most severe heat treatment. In every case, the color imparted to the polypropylene was much the same as that of the pigment itself, with no discernible ill effects from the heat of processing.

While it is true that the straight cobalt-phosphorus compounds have been utilized from time to time as pigments, these are basically two-component pigments deriving their principal coloring strength from the cobalt present. The incorporation of lithium into a cobalt-phosphorus system to promote the bluish to pink colors of this invention has resulted in a new series of colors not heretofore obtainable. The purples, lavenders and pinks of this invention, particularly those typified by numbers 3, 4, 5, 6, 8, 9 and 16 represent hues not heretofore readily attainable in a basically inorganic ceramic pigment.

Furthermore, previous two-component (2-oxide) pigments had very poor heat stability, one particular cobalt-ammonium phosphorus pigment previously known, being violet in color, and turning blue in polystyrene upon the application of processing heat.

As will be readily apparent from the foregoing specific working examples, the pigments of this invention, although inorganic, do not possess the necessary chemical structure for extremely high temperature applications such as for ceramic glazes, ceramic bodies or porcelain enamels, or as a tinting component dispersed in metals. However, for relatively low temperature applications, below 1000° F., they have extremely good chemical, heat and light stability.

In order to confirm the universal applicability inherent in the pigments of this invention for relatively low temperature use, one of the pigments of this invention, represented by the molecular composition $2CoO \cdot Li_2O \cdot P_2O_5$, was incorporated in various percentages in various polymers and copolymers including acetal, acrylic and butyrate copolymers; nylon, acrylonitril butadiene styrene, polycarbonate and melamine, all with the same outstanding results as achieved in the foregoing specific working examples.

The pigment was also utilized to successfully color epoxy based offset ink, a silicone resin, an acrylic-vinyl latex water based paint, a soya-alkyd oil based paint, and an epoxy-alkyd type thermofluid printing composition for glassware, of the general type exemplified by U.S. Pats. 2,950,209 and 2,823,138.

In like manner, the pigment of this invention, because of its stable non-reactive character at relatively low temperatures, makes an excellent coloring dispersion for paper, and paper products such as carbroard, as well as for plaster, plasterboard, cement, mortar and concrete.

Summarizing the scope of applicability of the pigments of this invention, they have utility as a coloring pigment for any product which, during that phase of its processing involving dispersion therein of the pigment of this invention, is not subjected to operating temperatures higher than 1000° F. and which are not designed for end use under conditions which would subject the pigmented article to temperatures in excess of 1000° F.

The only other limitation upon items which can be effectively colored by the pigment of this invention would be extremely acid or basic items, the preferable pH range being from about 4.0 to about 9.0, with items having a pH lower than 2.0 or greater than 11.0 having an acidity or basicity considered too extreme for optimum pigmenting with pigment of this invention.

The items herein discussed which may be colored with the pigment of this invention are defined broadly as "work products," and include any and all items enumerated above and any items which are essentially non-metallic having a pH of preferably from 4.0 to 9.0, exclusive of any items having a pH less than 2.0 or greater than 11.0, which are processed during or after dispersion therein of the pigment of this invention at temperatures 1000° F. or less, and which are not adapted for subsequent end use whereby they are subject to temperatures in excess of 1000° F.

Exemplary of such work products as defined above, but in no way to be considered a specific limitation thereto, are all manner of paints, lacquers and varnishes, and generally any composition adaptable to be colored by a pigment dispersed therein, and to be applied to a substrate to form a relatively thin, closely adherent coating thereto. "Paint" also to be constructed to include printing inks, vehicles and pastes for decorating any suitable substrate such as glass, metal, cloth, paper, sheeting, etc.

Work product is also construed to include within its scope all manner of polymers and copolymers generally designated as synthetic resins and exemplified by the specific working examples and disclosure set forth above, including, but not limited to, such polymers and/or copolymers disclosed in U.S. Pats. 2,985,617 to Salyer et al., and 3,328,334 to Charles H. Fuchsman, and patents referred to therein.

Work product is further construed to include within its scope, paper cardboard, and paper products generally, plaster, plaster of Paris, cement, concrete, mortar and plasterboard.

As is well known in the art, the concentration of pigment in any product to be colored is a matter of wide choice, depending upon the desired end result; and concentration, as such, is not critical to this invention. As with all such operations however, economic considerations, if nothing else, will militate against anyone going to absurd lengths to overload a product to be colored, with the pigment of this invention.

Hence, as used herein, such words or phrases as "dispersed," "pigment dispersion," "colored with . . . pigment" are intended to indicate conventional, common sense concentrations, widely variable, to provide any given coloring effect, without materially, adversely affecting the utility and end use properties of the work product colored by the pigment of this invention.

Having thus described and illustrated our invention, it is set forth in the following claims which are to be construed in the light of the United States statutes and decisions in such a manner as to give them the broad range of equivalents to which they are entitled.

We claim:

1. The combination of a reddish-blue calcined pigment composition and a work product colored reddish-blue thereby and having same dispersed throughout said work product, said pigment being the calcined product of an intimate admixture consisting essentially of a cobalt oxide yielding substance, a lithium oxide yielding substance, and a phosphorous oxide yielding substance, having same in relative amounts respectively, expressed as the oxide equivalents thereof, as defined in the polygon ABCDEFG of FIG. 1, said pigment present in said work product in from about 1 to about 10 parts by weight, said work product being essentially non-metallic, having a pH greater than 2 and less than 11.0 and adapted to be processed and used only at temperatures less than 1000° F.

2. The combination of a reddish-blue calcined pigment composition and a work product colored reddish-blue thereby and having same dispersed throughout said work product, said pigment being the calcined product of an intimate admixture consisting essentially of a cobalt oxide yielding substance, a lithium oxide yielding substance, and a phosphorus oxide yielding substance, having same in relative amounts respectively, expressed as the oxide equivalents thereof, as defined in the polygon EFHIJKL of FIG. 1, said pigment present in said work product in from about 1 to about 10 parts by weight, said work product being essentially non-metallic, having a pH greater than 2 and less than 11.0, and adapted to be processed and used only at temperatures less than 1000° F.

3. In a process for producing a reddish-blue work product colored with an inorganic reddish-blue pigment dispersed therein, said work product being essentially nonmetallic, having a pH greater than 2 and less than 11.0, and adapted to be processed and used only at temperatures less than 1000° F., the steps of:
  (a) Intimately admixing substances capable of yielding respectively cobalt oxide, lithium oxide and phosphorus oxide, having same in relative amounts respectively, expressed as the oxide equivalents thereof, as defined in the polygon ABCDEFG of FIG. 1,
  (b) calcining said admixture at a temperature of from about 250° C. to about 1000° C.,
  (c) pulverizing the calcined product of step (b) above into powder form,
  (d) adding from about 1 to about 10 parts by weight said pulverized product of step (c) to said work product,
  (e) intimately dispersing the product of step (c) throughout said work product in pigmenting amounts, to produce a reddish-blue pigmented work product.

4. The process of claim 3 wherein the polygon is EFHIJKL.

5. In a process for producing a reddish-blue work product colored with an inorganic reddish-blue pigment, said work product being essentially non-metallic, having a pH greater than 2 and less than 11.0, and adapted to be processed and used only at temperatures less than 1000° F., the steps of:
  (a) Intimately admixing substances capable of yielding respectively cobalt oxide, lithium oxide and phosphorus oxide, having same in relatively amounts respectively, expressed as the oxide equivalents thereof, as defined by point No. 3, $Li_2O \cdot 2CoO \cdot P_2O_5$, in the polygon EFHIJKL of FIG. 1,
  (b) calcining said admixture at a temperature of from about 250° C. to about 1000° C.,
  (c) pulverizing the calcined product of step (b) above into powder form,
  (d) adding from about 1 to about 10 parts by weight said pulverized product of step (c) to said work product,
  (e) intimately dispersing the product of step (c) throughout said work product in pigmenting amounts, to produce a reddish-blue pigmented work product.

6. In a process for producing a reddish-blue work product colored with an inorganic reddish-blue pigment, said work product being essentially nonmetallic, having a pH greater than 2 and less than 11.0, and adapted to be processed and used only at temperatures less than 1000° F., the steps of:
  (a) intimately admixing substances capable of yielding respectively cobalt oxide, lithium oxide and phosphorus oxide, having same in relative amounts respectively, expressed as the oxide equivalents thereof, as defined by point No. 10, $Li_2O \cdot CoO \cdot P_2O_5$, in the polygon EFHIJKL of FIG. 1,
  (b) calcining said admixture at a temperature of from about 250° C., to about 1000° C.,
  (c) pulverizing the calcined product of step (b) above into powder form,
  (d) adding from about 1 to about 10 parts by weight said pulverized product of step (c) to said work product,
  (e) intimately dispersing the product of step (c) throughout said work product in pigmenting amounts, to produce a reddish-blue pigmented work product.

7. As an article of manufacture, a reddish-blue organic synthetic resin selected from the group consisting of polyethylene, polystyrene, polypropylene and polyester, said article pigmented with from about 1 to about 10 parts, per 100 parts resin, of a calcined, inorganic pigment having a composition expressed as the oxide equivalents as identified in, and in the relative amounts defined by, the polygon ABCDEFG of FIG. 1.

8. The article of claim 7 wherein the oxide equivalents of said pigment are as identified in, and in the relative amounts defined by, the polygon EFHIJKL of FIG. 1.

9. As an article of manufacture, a reddish-blue organic plastic resin selected from the group consisting of polyethylene, polystyrene, polypropylene and polyester, said article pigmented with from about 1 to about 10 parts, per 100 parts resin, of calcined, inorganic pigment having a composition as defined by point No. 3, $$Li_2O \cdot 2CoO \cdot P_2O_5$$

in the polygon EFHIJKL of FIG. 1.

10. As an article of manufacture, a reddish-blue organic plastic resin selected from the group consisting of polyethylene, polystyrene, polypropylene and polyester, said article pigmented with from about 1 to about 10 parts, per 100 parts resin, of a calcined, inorganic pigment having a composition as defined by point No. 10, $Li_2O \cdot CoO \cdot P_2O_5$, in the polygon EFHIJKL of FIG. 1.

11. The combination of claim 1 wherein said intimate admixture contained additionally at least one of the substances selected from the class consisting of the oxide equivalent of sodium, the oxide equivalent of magnesium, and the oxide equivalent of zinc, in amounts respectively from about 0 to 25 parts by weight of $Na_2O$, 0 to 25 parts by weight of MgO, and 0 to 55 parts by weight ZnO.

12. The combination of claim 2 wherein said intimate admixture contained additionally at least one of the substances selected from the class consisting of the oxide equivalent of sodium, the oxide equivalent of magnesium, and the oxide equivalent of zinc, in amounts respectively from about 0 to 25 parts by weight of $Na_2O$, 0 to 25 parts by weight of MgO, and 0 to 55 parts by weight ZnO.

13. The combination of claim 1 wherein said work product is an item selected from the class consisting of paints, molded and sheet synthetic resins.

14. The combination of claim 2 wherein said work product is an item selected from the class consisting of paints, molded and sheet synthetic resins.

15. The combination of a reddish-blue calcined pigment composition and a work product colored reddish-blue thereby and having same dispersed throughout said work product, said pigment being the calcined product of an intimate admixture consisting essentially of a cobalt oxide yielding substance, a lithium oxide yielding substance, and a phosphorus oxide yielding substance, a lithium oxide yielding substance, and a phosphorus oxide yielding substance, having same in relative amounts respectively, expressed as the oxide equivalents thereof, as defined in the polygon ABCDEFG of FIG. 1, said pigment present in said work product in from about 1 to about 10 parts by weight, said work product being essentially non-metallic, having a pH greater than 4 and less than 9, and adapted to be processed and used only at temperatures less than 1000° F.

16. The combination of a reddish-blue calcined pigment composition and a work product colored reddish-blue thereby and having same dispersed throughout said work product, said pigment being the calcined product of an intimate admixture consisting essentially of a cobalt oxide yielding substance, a lithium oxide yielding substance, and a phosphorus oxide yielding substance, having same in relative amounts respectively, expressed as the oxide equivalents thereof, as defined in the polygon EFHIJKL of FIG. 1, said pigment present in said work product in from about 1 to about 10 parts by weight, said work product being essentially non-metallic, having a pH greater than 4 and less than 9, and adapted to be processed and used only at temperatures less than 1000° F.

17. The combination of claim 15 wherein said work product is an item selected from the class consisting of paints, molded and sheet synthetic resins.

18. The combination of claim 16 wherein said work product is an item selected from the class consisting of paints, molded and sheet synthetic resins.

References Cited

UNITED STATES PATENTS

| | | | |
|---|---|---|---|
| 3,079,269 | 2/1963 | Chrest et al. | 106—300 |
| 3,197,425 | 7/1965 | Konig et al. | 106—300 |
| 3,214,283 | 10/1965 | Chopoorian | 106—288 I |
| 3,249,398 | 5/1966 | Bayer | 106—288 I |

OTHER REFERENCES

Thilo, Isotypy Between Phosphates of General Composition $MLiPO_4$ and Silicates of the Olivine-Monticellite series, Naturwissenschaften, 29 (239) 1941 as abstracted in Chem. Abstracts, vol. 36, p. 694, January-March 1942.

JAMES E. POER, Primary Examiner

U.S. Cl. X.R.

106—292, 302; 260—41